United States Patent Office 3,822,330
Patented July 2, 1974

3,822,330
SEMI-PERMEABLE MEMBRANES
William McClements Muir, Gourock, and Robert Middleton Livingston, St. Peters, England, assignors to Babcock & Wilcox Limited, London, England
No Drawing. Filed Feb. 17, 1972, Ser. No. 227,263
Int. Cl. B29d 27/00
U.S. Cl. 264—41
10 Claims

ABSTRACT OF THE DISCLOSURE

A process for the manufacture of a semi-permeable membrane which comprises (A) preparing a casting solution containing a vinyl copolymer and an organic polar solvent; (B) casting the casting solution as a film; (C) evaporating the solvent from the film from step (B); (D) contacting the film from step (C) with water for at least 10 minutes. The semi-permeable membranes are used for reverse osmosis or hyperfiltration treatment of various feed solutions.

---

This invention relates to semi-permeable membranes and more particularly is concerned with forming polymeric membranes with a variety of permeability characteristics for reverse osmosis or hyperfiltration treatment of various feed solutions at various applied pressures and temperatures without using inorganic swelling agents to produce the required permeability of the membrane.

The most commonly used material for fabricating such semi-permeable membranes is cellulose acetate the structure of which membranes may be altered by omitting or modifying various steps during film fabrication (such as air drying) to produce cellulose acetate membranes with a permeability towards molecules larger than those encountered in effecting desalination of brine.

According to the present invention, there is provided a process for the manufacture of a semi-permeable membrane which includes (a) Preparing a solution containing a cellulose ester polymer or a vinyl copolymer and a powerful organic polar solvent for the polymer or copolymer having a relatively low vapour pressure;
(b) Casting the solution as a film;
(c) Evaporating the solvent from the film; and
(d) Contacting the film with water for at least 10 minutes.

Preferably, the organic polar solvent is dimethylformamide,
dimethylsulphoxide,
dimethylacetamide,
triethylphosphate, or
mixtures of any two or more of the foregoing solvents.

Suitably, the vinyl copolymer is linear in structure and contains a functional hydrophobic monomer imparting insolubility to the copolymer and acrylic or methacrylic acid. Advantageously the vinyl copolymer is of relatively high molecular weight and the functional hydrophobic monomer is styrene, methyl methacrylate or acrylonitrile.

The term "room temperature" used hereinafter and throughout the specification means a temperature in the range of 8° C. to 25° C.

The process is applicable to the formation of both open-pore and closed-pore membranes. Where an open-pore membrane structure is required, small amounts of water and/or acetone and/or methyl ethyl ketone, according to the basic constitution of the casting solution, are included in the casting solution.

Thus, open-pore membranes are prepared as follows:

(a) Preparation of open-pore films take place at room temperature;

(b) Film preparation consists of 3 steps:

(I) Casting Solution—Polymer Powder + Solvent cast at room temperature.
(II) Evaporation—Short times in the range of 2 to 25 minutes.
(III) Contacting with water at room temperature for at least 10 minutes.

(c) Factors affecting the physical structure and subsequent performance of the membrane are:

(i) Solvent: The solvent may be dimethylformamide, dimethylsulphoxide, dimethylacetamide or triethylphosphate or mixtures of two or more of these, together with water and/or acetone and/or methyl ethyl ketone. When the polymer is a vinyl copolymer the solvent system may include benzene together with water and/or acetone and/or methyl ethyl ketone or benzene may be used in place of any or all of these solvents.

(ii) Membrane Water Content: This apparently is an essential prerequisite for successful function, and the percentage weight of water must be high in the final polymer. Water may be added to the casting solution at formulation but enters the film at the contacting step.

(iii) Molecular Weight of Copolymer: Lower molecular weight copolymers appear more suited to high flux, open pore, reverse osmosis separation, since they give rise to a rapid aggregation of molecules at the gelation stage giving a more rigid but porous film.

(iv) Percentage Hydrophilic Monomers: As the proportion of hydrophilic monomer in the copolymer increases, film formation at the immersion step of the operable membrane is facilitated but there is a minimum hydrophilic monomer content required to provide compatibility with aqueous systems. However, the amount of hydrophilic monomer required varies according to the hydrophobic monomer used. Thus, when a styrene-methacrylic acid copolymer is used the prepared copolymer contains at least 40% acid.

Open-pore membranes prepared as disclosed herein tend to show higher fluxes for any given operating pressure up to 600 pounds per square inch than cellulose acetate polymers cast into membranes using inorganic swelling agents and acetone solvent.

The above described process is applicable to the preparation of both flat plate and tubular membranes, however in some instances it has been found that in order to achieve a satisfactory tubular membrane the membrane should be contacted with hot water (i.e. at least 80° C.) after a room temperature evaporation step.

Where a closed pore membrane is required water is not added to the casting solution.

Thus, closed-pore membranes are prepared as follows:

(a) Film preparation takes place at temperatures above normal room temperature, generally 40–50° C., and in an enclosed atmosphere of the evaporating solvent.

(b) Film preparation consists of 3 steps:

(I) Casting Solution. Polymer powder+solvent at a temperature in the range of 40° to 50° C.
(II) Evaporation of solvent from the film at temperatures 40–50° C. for not less than 2 and not more than 5 hours.
(III) Contacting the film with water at about 25° C. for at least 10 minutes.

(c) Factors affecting the physical structure and subsequent performance of the membrane are:

(i) Solvent: The solvent chosen must be a powerful solvent for the copolymer and have relatively low vapour pressure, e.g. dimethylformamide, dimethylsulphoxide, dimethylacetamide or triethylphosphate.

(ii) Membrane Water Content: This apparently is the criterion of successful reverse osmosis separation and is dictated by the undernoted factors (iii), (iv) and (v). However, water is not added to the casting solution but enters the film only at the water contacting step from the side eventually to be contacted by the feed solution.

(iii) Solvent Evaporation Time: This apparently dictates indirectly the subsequent membrane water content. The membrane is gelled only when the surface is no longer tacky. Contacting of the film with water while still tacky leads to poor mechanical strength, excessive water content and poor solute rejection rates. Drying times, however, must not be excessive. If they are, porosity is so reduced that flux is adversely affected. Evaporation of the solvent from the film may be effected by applying heat at a pressure substantially less than atmospheric until the film surface is no longer tacky.

(iv) Molecular Weight of Copolymer: This apparently should be as high as possible. This leads to higher solute rejection rates and greater membrane tensile characteristics.

(v) Percentage Hydrophilic Component: This apparently should be as high as possible commensurate with mechanical strength to optimise solvent flux. Since very high percentages of acid are only obtained by working with high molecular weight copolymers, the advantages of very high percentages of hydrophilic acid content in obtaining good ion rejection are only obtained by working with high molecular weight copolymers.

This invention will now be described with reference to the following examples. All parts and percentages given in the examples and throughout the specification are by weight unless otherwise stated.

EXAMPLE I

A copolymer of styrene with methacrylic acid containing 50% acid was prepared as a casting solution as follows:

|  | Grammes |
| --- | --- |
| Copolymer | 32 |
| Dimethylformamide | 245 |
| Acetone | 70 |

The casting solution was cast at room temperature as a film using a doctor blade with a blade opening of 0.005 inches, after ten minutes of solvent evaporation at room temperature, the plate was immersed in water at room temperature for 10 minutes to produce a membrane 0.0035 inches in thickness. This flat-plate membrane was tested in a test cell with whey feeds of differing concentrations for fractionation properties.

Feed: Whey, 6% solids. Applied Pressure: 620 pounds per square inch, gauge.

| Test Period Elapsed (hours): | Permeate flux rate (U.S. Gal./ft.$^2$/day)[1] |
| --- | --- |
| 1 | 12.8 |
| 2 | 12.4 |
| 3 | 12.8 |
| 4 | 11.9 |
| 5 | 11.9 |
| 6 | 12.1 |
| 7 | 11.9 |
| 8 | 11.9 |

[1] Product in all instances showed 99% protein rejection and clear eluate.

Feed: Whey, 30% solids. Applied Pressure: 650 pounds per square inch, gauge.

| Test Period Elapsed (hours): | Permeate flux rate (U.S. Gal./ft.$^2$/day)[1] |
| --- | --- |
| 1 | 8.9 |
| 2 | 7.1 |
| 3 | 7.1 |
| 4 | 7.0 |
| 5 | 7.0 |

[1] Product showed over 98% protein rejection and clear eluate.

EXAMPLE II

A copolymer of styrene with methacrylic acid containing 50% acid was prepared as a casting solution as follows:

|  | Grammes |
| --- | --- |
| Copolymer | 30 |
| Dimethylformamide | 270 |
| Water | 25 |

The casting solution was cast at room temperature as a film using a doctor blade opening of 0.005 inches. After 15 minutes drying at room temperature the plate was immersed in water at room temperature for 10 minutes to produce a membrane of approximately 0.003 inches in thickness. This flat plate membrane was tested in a test cell with 6% whey solution at 630 pounds per square inch gauge.

| Test Period (hours): | Permeate flux rate (U.S. Gal./ft.$^2$/day) |
| --- | --- |
| 1 | 11.4 |
| 2 | 11.8 |
| 3 | 11.7 |

Protein rejection was over 99% throughout the test period but lactose rejection was not measured.

EXAMPLE III

Casting dope containing a copolymer for styrene with methacrylic acid containing 50% acid was prepared as follows:

|  | Grammes |
| --- | --- |
| Copolymer | 12 |
| Acetone | 67 |
| Dimethylformamide | 24 |

This dope was cast at room temperature into a membrane with a doctor blade with a blade opening of 0.012 inches. After five minutes drying at room temperature the plate was immersed in water at room temperature for 10 minutes to produce a membrane of about 0.004 inches in thickness. This flat plate membrane was tested in a suitable cell with a 1% solution of sodium chloride at 1000 pounds per square inch gauge.

| Test period (hours) | Salt rejection, percent | Flux (U.S. Gal./ft.$^2$/day) |
| --- | --- | --- |
| 1 | 20 | 35 |
| 2 | 25 | 38 |
| 3 | 25 | 38 |
| 4 | 26 | 38 |

Acetone can only be used in such quntities if the molecular weight of the copolymer is not too high. This solvent has the advantage of "fixing" the membrane in a relatively short time, whilst rendering a membrane with adequate mechanical strength.

EXAMPLE IV

A copolymer of methyl methacrylate with methacrylic acid containing 40% acid was prepared in dope form as follows:

|  | Grammes |
| --- | --- |
| Copolymer | 10 |
| Water | 10 |
| Acetone | 71 |
| Dimethylformamide | 19 |

The dope was cast at room temperature into a membrane with a doctor blade with a blade opening of 0.012 inches. After five minutes drying at room temperature the plate was immersed in water at room temperature for 10 minutes to produce a membrane of about 0.004 inches in thickness. This flat plate membrane was tested in a cell with a 1% sodium chloride solution at 1000 pounds per square inch gauge.

| Test period (hours) | Salt rejection, percent | Flux (U.S. Gal./ft.²/day) |
|---|---|---|
| 1 | 17 | 16 |
| 2 | 17 | 16 |
| 3 | 17 | 15 |
| 4 | 18 | 14 |

EXAMPLE V

A copolymer of methyl methacrylate—methacrylic acid containing 40% acid was prepared in dope form as follows:

|   | Grammes |
|---|---|
| Copolymer | 27 |
| Dimethylformamide | 290 |
| Water | 30 |

The dope was cast at room temperature into a membrane with a doctor blade with a blade opening of 0.005 inches. After drying at room temperature for 20 minutes the plate was immersed in water at room temperature for 10 minutes to produce a membrane of about 0.025 inches in thickness. This flat plate membrane was tested in a cell with 6% whey solution at 600 pounds per square inch gauge.

| Test Period (hours): | Permate flux rate (U.S. Gal./ft.²/day)[1] |
|---|---|
| 1 | 7.8 |
| 2 | 7.2 |
| 3 | 7.2 |

[1] Product in all instances showed 99% protein rejection and clear eluate.

EXAMPLE VI

A copolymer of methyl methacrylate with methacrylic acid containing 40% acid was prepared in dope form as follows:

|   | Grammes |
|---|---|
| Copolymer | 26 |
| Dimethylformamide | 130 |
| Benzene | 130 |

The dope was cast at room temperature into a membrane with a doctor blade with a blade opening of 0.005 inches. After drying at room temperature for five minutes the plate was immersed in water at room temperature for 10 minutes to produce a membrane of about 0.002 inches in thickness. This membrane was tested with a 6% whey solution at 650 pounds per square inch gauge.

| Test period (hours): | Permeate flux rate (U.S. Gal./ft.²/day) |
|---|---|
| 1 | 7.4 |
| 2 | 7.5 |
| 3 | 7.4 |
| 7 | 2.5 |

Product in all instances showed 99% protein rejection and a clear eluate.

EXAMPLE VII

A copolymer of styrene with methacrylic acid containing 60% acid was prepared in the dope form as follows:

|   | Grammes |
|---|---|
| Copolymer | 10 |
| Dimethylformamide | 104 |

The dope which was at a temperature in the range of 40 to 50° C. was cast into a membrane with a doctor blade with a blade opening of 0.012 inches. The plate and film were placed in an oven at 42° C. for 5 hours at a vacuum of 26 inches of mercury after which the plate was immersed in water at about 25° C. for 10 minutes to produce a membrane of 0.002 inches in thickness. This flat plate membrane was tested at 1600 pounds per square inch gauge with a 1.2% sodium chloride solution.

| Test period (hours) | Salt rejection, percent | Flux (U.S. Gal./ft.²/day) |
|---|---|---|
| 3 | 76 | 1.5 |
| 6 | 86 | 1.8 |
| 9 | 87 | 3.1 |

EXAMPLE VIII

A copolymer of styrene and methacrylic acid containing 60% acid was prepared in dope form as follows:

|   | Grammes |
|---|---|
| Copolymer | 8 |
| Dimethylacetamide | 84 |

The dope which was at a temperature in the range of 40 to 50° C. was cast into a membrane with a doctor blade with a blade opening of 0.012 inches. The plate and film were placed in an oven at 40° C. for 4½ hours at a vacuum of 26 inches of mercury after which the plate was immersed in water at 25° C. for 10 minutes to produce a membrane of 0.0035 inches in thickness. This flat plate membrane was tested at 1700 pounds per square inch gauge with a 1.2% sodium chloride solution.

| Test period (hours) | Salt rejection, percent | Flux (U.S. Gal./ft.²/day) |
|---|---|---|
| 1 | 70 | |
| 3½ | 78 | 1.5 to 3.5 |
| 5½ | 82 | |
| 7½ | 84 | |

EXAMPLE IX

A copolymer of styrene with methacrylic acid containing 60% acid was prepared in dope form as follows:

|   | Grammes |
|---|---|
| Copolymer | 8 |
| Dimethylsulphoxide | 110 |

The dope which was at a temperature in the range of 40 to 50° C. was cast into a membrane with a doctor blade with a blade opening of 0.012 inches. The plate and film were placed in an oven at 50° C. for 8 hours at a vacuum of 30 inches of mercury after which the plate was immersed in water at a temperature of about 25° C. for 10 minutes to produce a membrane of 0.0025 inches in thickness. This flat plate membrane was tested at 1600 pound per square inch gauge with 1.2% sodium chloride solution.

| Time of test (hours) | Salt rejection, percent | Flux (U.S. Gal./ft.²/day) |
|---|---|---|
| 1 | 69 | |
| 2 | 78 | |
| 3 | 80 | 1.5 to 3.5. |
| 6 | 83 | |
| 8 | 85 | |

EXAMPLE X

A copolymer of styrene and methacrylic acid containing 70% acid was prepared in dope form as follows:

|   | Grammes |
|---|---|
| Copolymer | 8 |
| Dimethylformamide | 8.5 |

The dope which was at a temperature in the range of 40 to 50° C. was cast into a membrane with a blade opening of 0.012 inches. The plate and film were placed in an oven at 40° C. for 4½ hours at a vacuum of 26 inches of mercury after which the plate was immersed in water at a temperature of about 25° C. for 10 minutes to produce a membrane of 0.0028 inches in thickness. This flat plate membrane was tested at 800 pounds per square inch gauge with a 1.2% sodium chloride solution.

| Time of test (hours) | Salt rejection, percent | Flux (U.S. Gal./ ft.²/day) |
|---|---|---|
| ½ | 45 | |
| 1 | 54 | 1.5 to 3.5. |
| 2 | 60 | |
| 3 | 61 | |

EXAMPLE XI

A copolymer of styrene and acrylic acid containing 40% acid was prepared in dope form as follows:

| | Grammes |
|---|---|
| Copolymer | 11 |
| Dimethylformamide | 85 |

The dope which was at a temperature in the range of 40 to 50° C. was cast into a membrane with a doctor blade with a blade opening of 0.012 inches. The plate and films were place in an oven at 50° C. for 5 hours at a vacuum of 30 inches of mercury after which the plate was immersed in water at a temperature of about 25° C. for 10 minutes to produce a membrane of 0.0037 inches in thickness. This flat plate membrane was tested at 1700 pounds per square inch gauge with 1.2% sodium chloride solution.

| Time of test (hours) | Salt rejection, percent | Flux (U.S. Gal./ ft.²/day) |
|---|---|---|
| 5 | 91 | 1.3 |

EXAMPLE XII

A copolymer of acrylonitrile and acrylic acid containing 20% acid was prepared in dope form as follows:

| | Grammes |
|---|---|
| Copolymer | 6 |
| Dimethylformamide | 95 |

The dope which was at a temperature in the range of 40 to 50° C. was cast into a membrane with a doctor blade with a blade opening of 0.012 inches. The plate and films were placed in an oven at 40° C. for 5 hours at a vacuum of 30 inches of mercury after which the plate was immersed in water at a temperature of about 25° C. for 10 minutes to produce a membrane of 0.002 inches in thickness. This flat plate membrane was tested at 1600 pounds per square inch gauge with a 1.2% sodium chloride solution.

| Time of test (hours) | Salt rejection, percent | Flux (U.S. Gal./ ft.²/day) |
|---|---|---|
| 1 | 54 | 4.2 |
| 2 | 64 | 4.2 |
| 4 | 70 | 4.8 |
| 5 | 66 | 6.3 |
| 6 | 67 | 6.4 |

EXAMPLE XIII

A copolymer of methylmethacrylate with acrylic acid containing 30% acid was prepared in dope form as follows:

| | Grammes |
|---|---|
| Copolymer | 10 |
| Dimethylformamide | 85 |

The dope which was at a temperature in the range of 40 to 50° C. was cast on a glass plate using a doctor blade with a blade opening of 0.012 inches. The plate and film were placed in a vacuum oven at 40° C. for four hours at a vacuum of 30 inches of mercury after which the plate was immersed in water at a temperature of about 25° C. for 10 minutes to produce a membrane of 0.0045 inches in thickness. This flat plate membrane was tested at 1600 pounds per square inch gauge with a 1.2% sodium chloride solution.

| Test period (hours) | Salt rejection percent | Flux (U.S. Gal./ft.²/ day) |
|---|---|---|
| 2 | 45 | |
| 4 | 54 | 2 to 3. |
| 6 | 54 | |

EXAMPLE XIV

A copolymer of methylmethacrylate with methacrylic acid containing 20% acid prepared in dope form as follows:

| | Grammes |
|---|---|
| Copolymer | 9 |
| Dimethylformamide | 85 |

The dope which was at a temperature in the range of 40 to 50° C. was cast on to a place of glass using a doctor blade with a blade opening of 0.012 inches. The plate and film were placed in an oven at 40° C. for 5 hours at a vacuum of 30 inches of mercury after which the plate was immersed in water at a temperature of about 25° C. for 10 minutes to produce a membrane of 0.003 inches in thickness. This flat plate membrane was tested at 1600 pounds per square inch gauge with a 1% sodium chloride solution.

| Test period (hours) | Salt rejection percent | Flux (U.S. Gal./ft.²/ day) |
|---|---|---|
| 6 | 63 | |
| 14 | 84 | |
| 18 | 82 | 2.5 to 3.5. |
| 22 | 82 | |
| 28 | 82 | |

EXAMPLE XV

Cellulose acetate polymer powder was made into a casting dope according to the formulation:

| | Grammes |
|---|---|
| Cellulose acetate polymer | 22 |
| Dimethylformamide | 85 |

The dope which was at a temperature in the range of 40 to 50° C., was cast into a membrane with a doctor blade opening of 0.015 inches. The plate and film were placed in a vacuum oven at 45° C. for 5 hours at a vacuum of 26 inches of mercury after which the plate was immersed in water at a temperature of about 25° C. for 10 minutes to produce a membrane of 0.0032 inches in thickness. This flat plate film was tested at 1200 pounds per square inch gauge with a 1% sodium chloride solution.

| Time of test (hours) | Salt rejection, percent | Flux (U.S. Gal./ ft.²/day) |
|---|---|---|
| 6 | 73 | 3.6 |
| 16 | 68 | 5.2 |
| 18 | 72 | 5.6 |

EXAMPLE XVI

Cellulose acetate polymer powder was made into a casting dope according to the formulation:

| | Grammes |
|---|---|
| Cellulose acetate polymer | 85 |
| Dimethylsulphoxide | 260 |
| Water | 10 |

Water was added to the dope in aliquot amounts.

After mixing into a viscous liquid at room temperature and removing air bubbles, the dope was cast on to the inner wall of a suitable porous fibreglass tube with membrane thickness of 0.022 inches. After casting the membrane was exposed to a hot air blast between 50 to 70° C. for 20 minutes, contacted with water at 20° C. for 30 minutes and tested in a suitable high pressure apparatus using 6% protein solids and lactose whey feed solution. Performance obtained is shown:

| Pressure (pounds per square inch guage) | Pump capacity, percent | Effluent rate (U.S. Gal/ft.²/day) | Lactose rejection, percent |
|---|---|---|---|
| 60 | 40 | 5.1 | 4.9 |
|  | 30 | 4.0 | 19.7 |
|  | 20 | 3.0 | 4.9 |
| 100 | 50 | 6.7 | 3.2 |
|  | 40 | 5.6 |  |
|  | 20 | 3.7 | 23.8 |
| 200 | 60 | 8.2 | 30.2 |
|  | 40 | 6.3 | 23.8 |
|  | 20 | 4.1 | 20.6 |
| 300 | 60 | 8.3 | 39.7 |

EXAMPLE XVII

Cellulose acetate polymer powder was made into casting dope form according to the formulation:

| | Grammes |
|---|---|
| Cellulose acetate polymer | 90 |
| Dimethylformamide | 250 |
| Water | 20 |

After mixing to a viscous liquid and removing air bubbles, the dope was cast at room temperature in tubular form with a wall thickness of 0.022 inches. Immediately after casting, the membrane was dried by exposing it to a hot air blast for twenty minutes, exposed to stream of water at 20° C. for 30 minutes then tested. Performance obtained in separation of a mixture of 6% whey lactose and protein solids where 99% protein rejection was obtained is shown.

| Operating pressure (pounds per square inch, guage) | Pump capacity, percent | Effluent rate (U.S. gal./ft.²/day) 99% protein free | Lactose rejection, percent |
|---|---|---|---|
| 100 | 50 | 5.5 | 30.5 |
|  | 40 | 4.6 |  |
|  | 20 | 3.0 | 30.5 |
|  | 10 | 2.2 |  |
|  | 5 | 1.7 | 30.5 |
| 200 | 70 | 7.0 | 52.8 |
|  | 60 | 6.4 | 52.8 |
|  | 40 | 5.0 |  |
|  | 20 | 3.4 | 52.8 |
|  | 10 | 2.3 |  |
|  | 5 | 1.7 | 52.8 |
| 400 | 80 | 7.6 | 69.5 |
|  | 60 | 7.0 | 69.5 |
|  | 40 | 5.9 |  |
|  | 20 | 3.8 | 69.5 |
|  | 10 | 2.6 |  |
|  | 5 | 1.7 | 69.5 |

NOTE.—The independence of lactose rejection with change of Reynold's number. The increasing lactose rejection with increasing pressure. Traces of protein are present at low lactose rejections.

EXAMPLE XVIII

Cellulose acetate polymer powder was made into a casting dope according to the formulation:

| | Grammes |
|---|---|
| Cellulose acetate powder | 44 |
| Triethylphosphate | 140 |
| Acetone | 25 |

The dope was cast at room temperature on to the inner wall of a suitable porous fibreglass tube with a membrane thickness of about 0.01 inches. After casting the membrane was allowed to dry for three minutes at 15° C. and then a stream of water at 80° C. was passed through the inside of the tube for thirty minutes. The membrane was tested at 600 pounds per square inch gauge with a .4% sodium chloride solution at 36% pump capacity and gave rise to a flux averaging 19.1 U.S. gallons/ft.²/day and a salt rejection averaging 64%. It is anticipated that the performance of this membrane will be enhanced by heat treating at even higher temperatures than 80° C., possibly at temperatures appreciably exceeding 100° C., and possibly for periods longer than 30 minutes. In addition, it would appear that the properties of the membrane are enhanced by effecting the heat treatment by means of a flow of water, or perhaps steam, with or without superheat, at a pressure greater than atmospheric pressure, or the pressure external of the fibreglass tube.

EXAMPLE XIX

Vinyl Copolymer Tubular In-Situ Cast Membranes

A copolymer of styrene and methacrylic acid containing 60% acid was prepared in a dope form according to the formulation

| | Grammes |
|---|---|
| Copolymer | 30 |
| Dimethylformamide | 280 |
| Acetone | 72 |
| Water | 10 |

The dope was cast at room temperature in tubular form with a wet wall thickness of 0.022 inches. After casting, a 15 minute drying period at room temperature was allowed prior to exposure to water at room temperature for 30 minutes. This drying period was sufficient to render the necessary porosity and mechanical strength to the film for the separation. The membrane was tested using 6% whey solids feed solution. Performance obtained is shown:

| Operating pressure (pounds per square inch, gauge) | Reynolds number through tube | Effluent rate (U.S. Gal./ft.²/day) | Lactose rejection, percent |
|---|---|---|---|
| 50 | 7,500 | 4.6 | 0 |
| 80 | 7,500 | 7.3 | 26 |
| 80 | 10,000 | 7.8 | 26 |
| 105 | 11,250 | 7.5 | 28 |

We claim:

1. A process for the manufacture of semipermeable membranes which comprises:
   A. providing a casting solution consisting essentially of a vinyl copolymer dissolved in solvent wherein (a) said vinyl copolymer is substantially linear in structure made from hydrophilic monomer selected from the group consisting of acrylic acid and methacrylic acid and hydrophobic monomer selected from the group consisting of styrene, methyl methacrylate and acrylonitrile and (b) said solvent is selected from the group consisting of dimethylformamide, dimethylsulphoxide, dimethylacetamide and triethylphosphate, mixtures of two or more said group solvents, and mixtures of one or more said group solvents with liquid selected from the group consisting of water, acetone, benzene, methyl ethyl ketone and mixtures of said liquids;
   B. casting said casting solution as a film at a temperature between about 8° and 50° C.;
   C. evaporating solvent from the film resulting from step (B);
   D. contacting the film from step (C) with water at between about room temperature and 100° C. for at least 10 minutes.

2. A process for the manufacture of semi-permeable open-pore membranes which comprises:
   A. providing a casting solution consisting essentially of a vinyl copolymer dissolved in solvent wherein (a) said vinyl copolymer is substantially linear in structure made from hydrophilic monomer selected from the group consisting of acrylic acid and methacrylic acid and hydrophobic monomer selected from the group consisting of styrene, methyl methacrylate and acrylonitrile and (b) said solvent is selected from the group consisting of dimethylformamide, dimethylsulphoxide, dimethylacetamide and triethylphosphate, mixtures of two or more said group solvents and mixtures of one or more said group solvents with liquid selected from the group consisting of water, acetone, benzene, methyl ethyl ketone and mixtures of said liquids;

B. casting said casting solution as a film at a temperature between about 8° and 25° C.;

C. evaporating solvent from the film resulting from step (B) for between about 2 and 25 minutes;

D. contacting the film from step (C) with water at between about 8° and 25° C. for at least 10 minutes.

3. A process for the manufacture of semi-permeable closed-pore membranes which comprise:

A. providing a casting solution consisting essentially of a vinyl copolymer dissolved in a solvent wherein (a) said vinyl copolymer is substantially linear in structure made from hydrophilic monomer selected from the group consisting of acrylic acid and methacrylic acid and hydrophobic monomer selected from the group consisting of styrene, methyl methacrylate and acrylonitrile and (b) said solvent is selected from the group consisting of dimethylformamide, dimethylsulphoxide, dimethylacetamide and triethylphosphate and mixtures of one or more said group solvents;

B. casting said casting solution as a film at a temperature between about 40° and 50° C.;

C. evaporating solvent from the film resulting from step (B) at a temperature between about 40° and 50° C. for about 2 to 5 hours;

D. contacting the film resulting from step (C) with water at a temperature of about 25° C. for at least 10 minutes.

4. The process of claim 1 wherein said step (C) is carried out at a temperature between about 40° to 70° C. for a time in the range of 2 to 25 minutes.

5. The process of claim 4 wherein said step (C) is carried out by exposing said film to air blast at said temperature between about 40° to 70° C.

6. A process of claim 3 wherein said step (C) is conducted under sub-atmospheric pressure.

7. A process for the manufacture of semi-permeable open-pore membranes which comprises:

A. providing a casting solution consisting essentially of cellulose ester dissolved in solvent selected from the group consisting of dimethylformamide, dimethylsulphoxide, dimethylacetamide and triethylphosphate, mixtures of two or more of said group solvents and mixtures of one or more of said group solvents with liquid selected from the group consisting of water, acetone, methyl ethyl ketone and mixtures of said liquids;

B. casting said casting solution as a film at a temperature between about 8° and 25° C.;

C. evaporating solvent from the film resulting from step (B) for between about 2 and 25 minutes;

D. contacting the film from step (C) with water at between about 8° and 25° C. for at least 10 minutes.

8. A process for the manufacture of semi-permeable closed-pore membranes which comprises:

A. providing a casting solution consisting essentially of cellulose ester dissolved in solvent selected from the group consisting of dimethylformamide, dimethylsulphoxide, dimethylacetamide and triethylphosphate and mixtures of two or more said group solvents;

B. casting said casting solution as a film at a temperature between about 40° and 50° C.;

C. evaporating solvent from the film resulting from step (B) at a temperature between about 40° and 50° C. for about 2 to 5 hours;

D. contacting the film resulting from step (C) with water at a temperature of about 25° C. for at least 10 minutes.

9. The process of claim 7 wherein said step (C) is carried out at a temperature between about 40° to 70° C.

10. The process of claim 9 wherein said step (C) is carried out by exposing said film to air blast at said temperature between about 40° to 70° C.

References Cited

UNITED STATES PATENTS

| Re. 27,280 | 2/1972 | Manjikian | 264—41 |
|---|---|---|---|
| Re. 27,319 | 3/1972 | Manjikian et al. | 264—41 |
| 3,412,184 | 11/1968 | Sharples et al. | 264—41 |
| 3,657,401 | 4/1972 | Shayler et al. | 264—41 |
| 3,657,115 | 4/1972 | Manjikian et al. | 264—41 |
| 3,100,721 | 8/1963 | Holden | 264—41 |
| 3,190,765 | 6/1965 | Yuan | 264—49 |

MELVYN I. MARQUIS, Primary Examiner

U.S. Cl. X.R.

210—500; 264—49

UNITED STATES PATENT OFFICE
CERTIFICATE OF CORRECTION

Patent No. 3,822,330                    Dated July 2, 1974

Inventor(s) William McClements Muir & Robert Middleton Livingston

It is certified that error appears in the above-identified patent and that said Letters Patent are hereby corrected as shown below:

Claims priority, application Great Britain 04897/71
filed February 18, 1971

Signed and sealed this 24th day of September 1974.

(SEAL)
Attest:

McCOY M. GIBSON JR.                C. MARSHALL DANN
Attesting Officer                  Commissioner of Patents